(12) United States Patent
Reevell (10) Patent No.: US 12,207,361 B2
(45) Date of Patent: *Jan. 21, 2025

(54) AEROSOL-GENERATING SYSTEMS WITH LIQUID LEVEL DETERMINATION AND METHODS OF DETERMINING LIQUID LEVEL IN AEROSOL-GENERATING SYSTEMS

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 906 days.

This patent is subject to a terminal disclaimer.

(21) Appl. No.: 17/241,488

(22) Filed: Apr. 27, 2021

(65) Prior Publication Data

US 2021/0251044 A1 Aug. 12, 2021

Related U.S. Application Data

(60) Division of application No. 15/441,795, filed on Feb. 24, 2017, now Pat. No. 11,006,669, which is a
(Continued)

(30) Foreign Application Priority Data

Feb. 25, 2016 (EP) .................................... 16157420

(51) Int. Cl.
*H05B 1/02* (2006.01)
*A24F 40/50* (2020.01)
(Continued)

(52) U.S. Cl.
CPC .......... *H05B 1/0227* (2013.01); *A24F 40/50* (2020.01); *G01F 23/22* (2013.01); *A24F 40/10* (2020.01); *G01F 22/00* (2013.01)

(58) Field of Classification Search
CPC .......... A24F 40/00; A24F 40/10; A24F 40/40; A24F 40/44; A24F 40/46; A24F 40/50;
(Continued)

(56) References Cited

U.S. PATENT DOCUMENTS

| 5,634,592 | A | 6/1997 | Campau |
| 11,006,669 | B2 * | 5/2021 | Reevell ................ H05B 1/0227 |

(Continued)

FOREIGN PATENT DOCUMENTS

| CN | 103338664 A | 10/2013 |
| CN | 203662023 U | 6/2014 |

(Continued)

OTHER PUBLICATIONS

European Notice of Allowance dated Jun. 9, 2022 for corresponding European Application No. 17700217.7.
(Continued)

*Primary Examiner* — Sang Y Paik
(74) *Attorney, Agent, or Firm* — Harness, Dickey & Pierce, P.L.C.

(57) ABSTRACT

An electrically operated aerosol-generating system may include a liquid storage portion configured to store a liquid from which aerosol may be generated, an electric heater, a capillary wick extending between the liquid storage portion and the electric heater and configured to convey liquid from the liquid storage portion to the electric heater and electric circuitry connected to the electric heater. The electric circuitry may be configured to: activate the electric heater for a first heating time period in response to an input to vaporize liquid in the capillary wick, activate the electric heater for a second heating time period upon the elapse of a first cooling time period after the first heating time period, record a temperature measurement of the electric heater during the second heating time period, and determine an amount of
(Continued)

liquid in the liquid storage portion based on the temperature measurement.

7 Claims, 4 Drawing Sheets

Related U.S. Application Data continuation of application No. PCT/EP2017/050374, filed on Jan. 10, 2017.

(51) Int. Cl.
*G01F 23/22* (2006.01)
*A24F 40/10* (2020.01)
*G01F 22/00* (2006.01)

(58) Field of Classification Search
CPC .......... A24F 40/51; A24F 40/53; A24F 40/57; G01F 22/00; G01F 23/22; H05B 1/0227; H05B 2203/021; H05B 2203/022; H04B 3/78
USPC ......................................................... 392/387
See application file for complete search history.

(56) References Cited

U.S. PATENT DOCUMENTS

| | | |
|---|---|---|
| 2011/0036346 A1 | 2/2011 | Cohen et al. |
| 2012/0291791 A1 | 11/2012 | Pradeep |
| 2013/0104916 A1 | 5/2013 | Bellinger et al. |
| 2013/0306084 A1 | 11/2013 | Flick |
| 2013/0319435 A1 | 12/2013 | Flick |
| 2014/0000638 A1 | 1/2014 | Sebastian et al. |
| 2014/0020693 A1 | 1/2014 | Cochand et al. |
| 2014/0096781 A1 | 4/2014 | Sears et al. |
| 2014/0229137 A1 | 8/2014 | Rusnack et al. |
| 2014/0299141 A1 | 10/2014 | Flick |
| 2014/0305450 A1 | 10/2014 | Xiang |
| 2014/0338680 A1 | 11/2014 | Abramov et al. |
| 2014/0338685 A1 | 11/2014 | Amir |
| 2014/0345633 A1 | 11/2014 | Talon et al. |
| 2015/0053217 A1 | 2/2015 | Steingraber et al. |
| 2015/0208727 A1 | 7/2015 | Kuczaj |
| 2015/0359263 A1 | 12/2015 | Bellinger |

FOREIGN PATENT DOCUMENTS

| | | |
|---|---|---|
| CN | 103974638 A | 8/2014 |
| CN | 104116138 A | 10/2014 |
| CN | 204317510 U | 5/2015 |
| EP | 2257195 B1 | 6/2012 |
| EP | 2468117 A1 | 6/2012 |
| EP | 2468118 A1 | 6/2012 |
| EP | 2471392 B1 | 9/2013 |
| JP | 2014-501105 A | 1/2014 |
| JP | 2014-530632 A | 11/2014 |
| WO | WO-2008/077271 A1 | 7/2008 |
| WO | WO-2009/118085 A1 | 10/2009 |
| WO | WO-2009/127401 A1 | 10/2009 |
| WO | WO-2011/137453 A2 | 11/2011 |
| WO | WO-2011/146329 A2 | 11/2011 |
| WO | WO-2012/027350 A2 | 3/2012 |
| WO | WO-2012/072790 A1 | 6/2012 |
| WO | WO-2012/085202 A1 | 6/2012 |
| WO | WO-2012/085203 A1 | 6/2012 |
| WO | WO-2012/085207 A1 | 6/2012 |
| WO | WO-2013/060781 A1 | 5/2013 |
| WO | WO-2013/060784 A2 | 5/2013 |
| WO | WO-2013/098398 A2 | 7/2013 |
| WO | WO-2014-040988 A2 | 3/2014 |
| WO | WO-2014/106328 A1 | 7/2014 |
| WO | WO-2014/138244 A1 | 9/2014 |
| WO | WO-2014/150247 A1 | 9/2014 |
| WO | WO-2014/166037 A1 | 10/2014 |
| WO | WO-2014/166121 A1 | 10/2014 |
| WO | WO-2015/015431 A1 | 2/2015 |
| WO | WO-2017/084818 A1 | 5/2017 |

OTHER PUBLICATIONS

European Communication under Rule 71(3) EPC dated Feb. 8, 2022 for corresponding European Application No. 17700217.7.
Korean Office Action dated Feb. 26, 2024 for corresponding Korean Application No. 10-2018-7022230, and English-language translation thereof.
Chinese Office Action dated Jul. 1, 2021 for corresponding Chinese Application No. 201780009148.3, and English-language translation thereof.
Japanese Decision to Grant dated Jun. 17, 2021 for corresponding Japanese Application No. 2018-541198, and English-language translation thereof.
Chinese Notice of Allowance dated Sep. 8, 2021 for corresponding Chinese Application No. 201780009148.3.
European Search Report for European Patent Application No. 16157420.7 Dated Sep. 5, 2016.
International Search Report and Written Opinion dated Apr. 20, 2017, issued in corresponding International Application No. PCT/EP2017/050374.
Written Opinion of the International Preliminary Examining Authority dated Feb. 6, 2018 for corresponding International Application No. PCT/EP2017/050374.
Notification of Transmittal of the International Preliminary Report on Patentability dated Jun. 13, 2018 for corresponding International Application No. PCT/EP2017/050374.
European Office Action dated Oct. 17, 2019 for corresponding European Application No. 17700217.7.
Russian Decision to Grant and Search Report dated Feb. 28, 2020 for corresponding Russian Application No. 2018133580/12(055171).
Chinese Office Action dated Aug. 13, 2020 for corresponding Chinese Patent Application No. 201780009148.3 and English translation thereof.
Japanese Office Action dated Jan. 14, 2021 for corresponding Japanese Application No. 2018-541198, and English-language translation thereof.
Korean Notice of Allowance dated Oct. 22, 2024 for corresponding Korean Application No. 10-2018-7022230, and English-language translation thereof.

* cited by examiner

AEROSOL-GENERATING SYSTEMS WITH LIQUID LEVEL DETERMINATION AND METHODS OF DETERMINING LIQUID LEVEL IN AEROSOL-GENERATING SYSTEMS

CROSS-REFERENCE TO RELATED APPLICATIONS

This application is a divisional of U.S. application Ser. No. 15/441,795, filed Feb. 24, 2017, which is a continuation of, and claims priority to, international application no. PCT/EP2017/050374, filed on Jan. 10, 2017, and further claims priority under 35 U.S.C. § 119 to European Patent Application No. 16157420.7, filed Feb. 25, 2016, the entire contents of each of which are incorporated herein by reference.

BACKGROUND

Field

Some example embodiments relate to an electrically operated aerosol-generating system. In particular, some example embodiments relate to an electrically operated aerosol-generating system in which an aerosol-forming substrate is liquid and is contained in a liquid storage portion.

Description of Related Art

WO 2012/085203 A1 discloses an electrically heated vaping system having a liquid storage portion. The liquid storage portion includes a liquid aerosol-forming substrate and is connected to a vaporizer comprising an electric heater which is powered by a battery supply. The electric heater is activated based on air being drawn through an outlet. The heated aerosol-forming substrate contained in the vaporizer is vaporized by the activated heater. Air drawn along or through the vaporizer based on air being drawn through the outlet entrains and cools the vapor to generate an aerosol. The generated aerosol is drawn through the outlet. An amount of depletion of liquid aerosol-forming substrate is determined based on a relationship between a power applied to the heating element and a resulting temperature change of the heating element once the heating element is activated. The determined amount of depletion is indicated.

This approach relies on the fact that when there is less liquid in the vicinity of the heating element, for a given applied power, the heating element will be heated at a higher rate. So if the liquid aerosol-forming substrate is depleted to a level such that there is a significant reduction in liquid in the vicinity of the heating element when the heater is activated, then there will be a significantly higher temperature change of the heating element than under normal conditions, when the liquid storage portion is full of liquid. This means that liquid depletion can only be determined when the level of liquid in the liquid storage portion has been significantly depleted. It also means that liquid level can only be determined as air is being drawn through the outlet.

It would be desirable to provide an aerosol-generating system that determines the level of liquid in a liquid storage portion more accurately, particularly at times when the liquid storage portion is not nearly empty.

SUMMARY

According to some example embodiments, an electrically operated aerosol-generating system may include a liquid storage portion configured to store a liquid from which aerosol may be generated, an electric heater, a capillary wick extending between the liquid storage portion and the electric heater, and electric circuitry connected to the electric heater. The capillary wick may be configured to convey liquid from the liquid storage portion to the electric heater. The electric circuitry may be configured to activate the electric heater for a first heating time period in response to an input to vaporize liquid in the capillary wick, activate the electric heater for a second heating time period upon an elapse of a first cooling time period after the first heating time period, record a temperature measurement of the electric heater during or immediately following the second heating time period, and determine an amount of liquid in the liquid storage portion based on the temperature measurement.

The first cooling time period may be shorter than a time period associated with an amount of liquid in the wick reaching equilibrium following the first heating time period.

The electric circuitry may be configured to activate the electric heater, such that a temperature of the electric heater is lower than a vaporization temperature of the liquid during the second heating time period.

The electric circuitry may be configured to activate the electric heater for a third heating time period upon an elapse of a second cooling time period after the second heating time period, record a temperature measurement of the electric heater during the third heating time period, and determine an amount of liquid in the liquid storage portion based on a combination of the temperature measurement of the electric heater during the third heating time period and the temperature measurement of the electric heater during the second heating time period.

The electric circuitry may be configured to activate the electric heater, such that a temperature of the electric heater is lower than a vaporization temperature of the liquid during the third heating time period.

A sum of the first cooling time period, the first heating time period and the second cooling time period may be shorter than a period of elapsed time associated with an amount of liquid in the wick reaching equilibrium following the first heating time period.

The capillary wick may have a fibrous or spongy structure.

The liquid storage portion may be configured to retain the liquid in a liquid carrier material.

The second heating time period may be between 0.05 and 0.5 seconds.

The first cooling time period may be between 0.2 and 2 seconds.

The electric circuitry may include a memory. The memory may be configured to store a look-up table relating temperature measurements to liquid levels.

The electric circuitry may be configured to determine whether to subsequently activate the electric heater for the second heating time period upon the elapse of the first cooling time period after the first heating time period based a previously determined amount of liquid or based on stored heater activation data.

The electrically operated aerosol-generating system may be an electrically operated vaping system.

According to some example embodiments, a method for determining an amount of liquid in an electrically operated aerosol-generating system may include: activating an electric heater for a first heating time period in response to an input to vaporize liquid in a capillary wick, activating the electric heater for a second heating time period upon an elapse of a first cooling time period after the first heating time period, recording a temperature measurement of the electric heater during or immediately following the second heating time period, and determining a liquid level in the liquid storage portion based on the temperature measurement. The electrically operated aerosol-generating system may include a liquid storage portion configured to store a liquid from which aerosol may be generated, an electric heater, a capillary wick between the liquid in the liquid storage portion and the electric heater and configured to convey liquid from the liquid storage portion to the electric heater, and electric circuitry connected to the electric heater, the electric circuitry configured to control activation of the electric heater.

According to some example embodiments, a computer readable storage medium has stored thereon a computer program which, when run on programmable electric circuitry in an electrically operated aerosol-generating system, causes the programmable electric circuitry to perform the method. The electrically operated aerosol-generating system may include a liquid storage portion configured to store a liquid from which aerosol may be generated, an electric heater, a capillary wick extending between the liquid storage portion and the electric heater and configured to convey liquid from the liquid storage portion to the electric heater, and programmable electric circuitry connected to the electric heater and configured to control activation of the electric heater.

BRIEF DESCRIPTION OF THE DRAWINGS

Example embodiments will be further described, by way of example only, with reference to the accompanying drawings, of which.

DETAILED DESCRIPTION

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Some example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values therebetween. When ranges are specified, the range includes all values therebetween such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

In some example embodiments, an electrically operated aerosol-generating system may include a liquid storage portion configured to store a liquid from which aerosol may be generated; an electric heater; a capillary wick positioned between the liquid in the liquid storage portion and the electric heater (e.g., the capillary wick extends between the liquid storage portion and the electric heater) and configured to convey liquid from the liquid storage portion to the electric heater; and electric circuitry connected to the electric heater, the electric circuitry configured to: activate the electric heater for a vaporizing period (also referred to herein as a "first heating time period") in response to an input to vaporize liquid in the capillary wick, a first particular (or, alternatively, predetermined) time (also referred to herein as a "first cooling time period") after the vaporizing period, activate the heater for a second period (also referred to herein as a "second heating time period"), record a temperature measurement of the heater during or immediately following the second period, and determine a liquid level in the liquid storage portion based on the temperature measurement.

During the vaporizing period, liquid in the wick is vaporized by the heat generated by the electric heater. This means that liquid from the liquid storage portion will be drawn into the capillary wick by capillary action to replace the liquid that has been vaporized. The rate at which liquid is drawn into the wick is dependent on the level of liquid in the liquid storage portion. If there is large amount of liquid in the liquid storage portion, the liquid will be drawn into the wick at faster rate than if there is only a small amount of liquid remaining in the liquid storage portion.

"Liquid level" as used herein refers to an amount of liquid in the liquid storage portion. It may be a percentage or proportion of a maximum amount of liquid or it may be an absolute amount of liquid. The amount may be a mass or a volume of liquid, or a density of liquid within a carrier material.

As described, for a given amount of power applied to the electric heater, the rate of increase of heater temperature is dependent on the environment surrounding the heater and in particular on the amount of liquid in the vicinity of the heater. When there is less liquid in the vicinity of the heating element, for a given amount of applied power the heating element will be heated to a higher temperature. So the temperature measurement taken during the second period ("second heating time period"), or immediately after the second period, provides information about ("information associated with") the amount of liquid in the wick and therefore the rate that liquid has been drawn into the wick following the vaporizing period. The temperature measurement is in some example embodiments made during the second period but may be made immediately after the second period. "Immediately after" in this context means between 0 and 2 seconds after the second period. If the temperature measurement is made after the second period, in some example embodiments it is made between 0 and 0.5 seconds after the second period.

The electrically operated aerosol-generating system may be configured to deliver aerosol through an outlet portion. Air may be drawn into the system and through the outlet of the system, and generated aerosol may be drawn out of the system through the outlet. Airflow as a result of a user a puff (also referred to herein as air being drawn through the outlet) may be detected and used as a trigger to start the vaporizing period. The vaporizing period may also be ended at a time dependent on ("based on") detected airflow through the system.

The first particular (or, alternatively, predetermined) time (e.g., "first cooling time period") is in some example embodiments shorter than a time needed for an amount of liquid in the wick to reach equilibrium following the vaporizing period. This means that the temperature measurement may be made as liquid is still wicking on to the capillary wick and the temperature measurement is directly related to the wicking rate of the liquid. Equilibrium in this context means a condition in which liquid is no longer being drawn into the wick because the wick is saturated or has reached hydrostatic equilibrium with the liquid within the liquid storage portion.

However, the time taken to reach equilibrium may be dependent on the liquid level within the liquid storage portion. It is possible for the first cooling time period to be greater than the time period associated with an amount of liquid in the wick reaching equilibrium following the vaporizing period during some conditions, such as when the liquid storage portion is relatively full of liquid and to only be shorter than a period of time needed for an amount of liquid in the wick to reach equilibrium following the vaporizing period when the liquid storage portion is becoming empty.

In some example embodiments, the electric circuitry is configured to activate the heater such that the temperature of the heater is lower than a vaporization temperature of the liquid during the second period (e.g., "second heating time period"). This means that the liquid level determination can be made without vaporizing a significant amount of liquid. This both reduces liquid consumption and reduces the possibility of generated aerosol condensing within the system because it has not been drawn out of the system through the outlet thereof.

In some example embodiments, the step of activating the heater for a second period is carried out only in absence of a further input during the first particular time (e.g., during the elapse of the first cooling time period). In some example embodiments, the step of activating the heater for a second period comprises applying a particular (or, alternatively, predetermined) amount of electrical power to the heater.

By measuring heater temperature during a time period when air is not being drawn through the device and through an outlet thereof, a more reliable measurement can be obtained. The temperature of the heater may be dependent not only on the amount of liquid in the vicinity of the heater but also on other factors, one of which may be airflow rate past the heater. Airflow past the heater as a result of air being drawn through the device and through an outlet thereof may have a cooling effect on the heater. As airflow as a result of air being drawn through the device and through an outlet thereof is not consistent from drawing to drawing, this inevitably makes a determination of liquid level based on temperature during air being drawn through the device and through an outlet thereof less reliable. By measuring temperature at a time when the air is not being drawn through the device and through an outlet thereof, the measurement is independent of airflow strength.

Most previous methods of determining liquid levels in systems of this type have relied on measuring liquid consumption by monitoring heater activation. Such previous methods may include determining an initial liquid level, and such determining may rely on storing heater activation data over time. Some example embodiments do not require storage of any heater activation data or knowledge of an initial liquid level. This is particularly advantageous for systems in which the liquid storage portion is refillable to different levels ("amounts") of liquid.

The electric circuitry may be configured to activate the heater for a third period (also referred to herein as a third heating time period) at a second particular (or, alternatively, predetermined) time after the second period (e.g., upon the elapse of a second cooling time period after the second heating time period), to record a temperature measurement of the heater during the third period, and to determine a liquid level (e.g., amount of liquid) in the liquid storage portion based on a combination of the temperature measurement of the heater during the third period and the temperature measurement of the heater during the second period. In particular, the liquid level in the liquid storage portion may be based on a difference between the temperature measurement of the heater during the third period and the temperature measurement of the heater during the second period.

The temperature measurement of the heater during the third period and the temperature measurement of the heater during the second period are indicative of the amount of liquid in the vicinity of the heater at those times. A difference between those measurements therefore provides a measure of the wicking rate. This arrangement has the advantage that it is independent of the level of liquid around the heater at the end of the vaporizing period. Although the amount of liquid remaining in the vicinity of the heater at the end of the vaporization period is generally quite consistent (and low), if the vaporizing period has been very short (because of a short or aborted draw of air, for example), there may be unusually high levels ("amounts") of liquid remaining in the wick in the vicinity of the heater.

In some example embodiments, the length of the vaporizing period ("first heating time period") or the total power applied during the vaporizing period (or some other parameter of the vaporizing period) may be factored into the determination of liquid level. It can be assumed that the longer the vaporizing period or the more power applied during the vaporizing period, the less liquid is in the vicinity of the heater at the end of the vaporization period. This can be factored into a calculation of wicking rate based on a single temperature measurement.

In some example embodiments, the electric circuitry is configured to activate the heater such that the temperature of the heater is lower than a vaporization temperature of the liquid during the third period.

In some example embodiments, the sum of the first particular (or, alternatively, predetermined) time ("first cooling time period"), the first period ("first heating time period") and the second time ("second cooling time period") is shorter than a time needed for an amount of liquid in the wick to reach equilibrium following the vaporizing period. This means that the temperature measurement is made as liquid is still wicking on to the capillary wick when the heater temperature is measured during the third period ("third heating time period").

The system may comprise one or more capillary wicks. The one or more capillary wicks are configured to transfer liquid aerosol-forming substrate from the liquid storage portion to the heater. The one or more capillary wicks may comprise a capillary material. A capillary material is a material that is configured to actively convey liquid from one end of the material to another.

The structure of the capillary material may comprise a plurality of small bores or tubes, through which the liquid can be transported by capillary action. The capillary material may have a fibrous structure. The capillary material may have a spongy structure. The capillary material may comprise a bundle of capillaries. The capillary material may comprise a plurality of fibers. The capillary material may comprise a plurality of threads. The capillary material may comprise fine bore tubes. The fibers, threads or fine-bore tubes may be generally aligned to convey liquid to the aerosol-generating means. The capillary material may comprise a combination of fibers, threads and fine-bore tubes. The capillary material may comprise sponge-like material. The capillary material may comprise foam-like material.

The capillary material may comprise any suitable material or combination of materials. Examples of suitable materials are a sponge or foam material, ceramic- or graphite-based materials in the form of fibers or sintered powders, foamed metal or plastics materials, a fibrous material, for example made of spun or extruded fibers, such as cellulose acetate, polyester, or bonded polyolefin, polyethylene, terylene or polypropylene fibers, nylon fibers or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and atom pressure, which allow the liquid to be transported through the capillary material by capillary action.

The one or more capillary wicks may have a first end and a second end. The first end may extend into the liquid storage portion and may be configured to draw liquid held in the liquid storage portion to the heater. The second end may extend into an air passage of the aerosol-generating system. The second end may comprise one or more heating elements. The first end and the second end may extend into the liquid storage portion. The heater may comprise one or more heating elements which may be arranged at a central portion of the wick between the first and second ends. In use, when the one or more heating elements are activated during the vaporization period ("first heating time period"), the liquid in the one or more capillary wicks is vaporized at and around the one or more heating elements. The heating elements may comprise a heating wire or filament. The heating wire or filament may support or encircle a portion of the one or more capillary wicks.

The liquid may have physical properties, including viscosity, which allow the liquid to be transported through the one or more capillary wicks by capillary action.

The liquid may comprise nicotine. The nicotine containing liquid may be a nicotine salt matrix. The liquid may comprise plant-based material. The liquid may comprise tobacco. The liquid may comprise a tobacco-containing material containing volatile tobacco flavor compounds, which are released from the liquid upon heating. The liquid may comprise homogenized tobacco material. The liquid may comprise a non-tobacco-containing material. The liquid may comprise homogenized plant-based material.

The liquid may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavorants.

The liquid may comprise water, solvents, ethanol, plant extracts and natural or artificial flavors. The liquid may comprise nicotine and at least one aerosol former. The aerosol former may be glycerine. The aerosol-former may be propylene glycol. The aerosol former may comprise both glycerine and propylene glycol. The liquid may have a nicotine concentration of between about 0.5% and about 10%.

A carrier material may be arranged in the liquid storage portion for holding the liquid. The carrier material may be made from any suitable absorbent body of material, for example, a foamed metal or plastics material, polypropylene, terylene, nylon fibers or ceramic. The liquid may be retained in the carrier material prior to use of the aerosol-generating system. The liquid may be released into the carrier material during use. The liquid may be released into the carrier material immediately prior to use. For example, the liquid may be provided in a capsule. The shell of the capsule may melt upon heating by the heating means and releases the liquid aerosol-forming substrate into the carrier material. The capsule may contain a solid in combination with the liquid.

The second period ("second heating time period") may between 0.05 and 0.5 seconds. It is only necessary to very briefly activate the heater and measure the temperature before it approaches the vaporization temperature of the liquid.

The first particular (or, alternatively, predetermined) time period ("first cooling time period") may be between 0.2 and 2 seconds. It is desirable to provide a short time period of cooling of the heater before reactivating it to ensure that the heater returns to a predicable temperature and so that it remains below the vaporization temperature of the liquid during the subsequent activation of the heater. However, as explained, it is also desirable to measure the temperature while liquid is being drawn onto the wick, i.e. before equilibrium is reached. The time period chosen for the first particular (or, alternatively, predetermined) time period will depend on the properties of the capillary wick being used and on the properties of the liquid and the heater.

The electric circuitry may comprise a memory, wherein the memory stores a look-up table relating temperature measurements to liquid levels. The electric circuitry may be configured to compare measured temperatures with stored temperature measurements to determine a liquid level. The relationship between the measured temperature or temperature difference and the liquid level in the liquid storage portion may be determined empirically for a particular design of aerosol-generating system and stored in the memory as part of a manufacturing process.

The electric circuitry may comprise any suitable elements. The electric circuitry may comprise a microprocessor. The microprocessor may be a programmable microprocessor.

The electric circuitry may be configured to control the supply of power to the heater. The electric circuitry may be configured to supply a particular (or, alternatively, predetermined) amount of power to the heater. The heater may be activated on supply of the particular (or, alternatively, predetermined) power by the electric circuitry. The electric circuitry may be configured to monitor the power supplied to the aerosol-generating means.

The heater may comprise one or more heating elements. The one or more heating elements may be arranged appropriately so as to most effectively heat the liquid in the capillary wick. The one or more heating elements may be arranged to heat the liquid primarily by means of conduction. The one or more heating elements may be arranged substantially in direct contact with the liquid and wick. The one or more heating elements may be arranged to transfer heat to the liquid via one or more heat conductive elements.

The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys and composite materials made of a ceramic material and a metallic material.

The one or more electric heating elements may take any suitable form. For example, the one or more electric heating elements may take the form of one or more heating blades. The one or more electric heating elements may take the form of a casing or substrate having different electro-conductive portions, or one or more electrically resistive metallic tube. The heater may comprise one or more heater filaments in the form of a coil extending around the wick.

The heater may be a substantially flat heater. As used herein, "substantially flat" refers to a heater that is in the form of a substantially two dimensional topological manifold. Thus, the substantially flat heater extends in two dimensions along a surface substantially more than in a third dimension. In particular, the dimensions of the substantially heater in the two dimensions within the surface is at least 5 times larger than in the third dimension, normal to the surface. An example of a substantially flat heater is a structure between two substantially parallel surfaces, wherein the distance between these two surfaces is substantially smaller than the extension within the surfaces. In some embodiments, the substantially flat heater is planar. In other embodiments, the substantially flat heater is curved along one or more dimensions, for example forming a dome shape or bridge shape.

The heater may comprise a plurality of heater filaments. The term "filament" is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The plurality of filaments may be an array of filaments, for example arranged parallel to each other. The filaments may form a mesh. The mesh may be woven or non-woven. The plurality of filaments may be positioned adjacent to or in contact with the capillary wick holding the aerosol-forming substrate. The filaments may define interstices between the filaments and the interstices may have a width of between 10 µm and 100 µm. The filaments may give rise to capillary action in the interstices, so that in use, liquid to be vaporized is drawn into the interstices, increasing the contact area between the heater assembly and the liquid.

In one example, the heater comprises a mesh of filaments formed from 304L stainless steel. The filaments have a diameter of around 16 µm. The mesh is connected to electrical contacts that are separated from each other by a gap and are formed from a copper foil having a thickness of around 30 µm. The electrical contacts are provided on a polyimide substrate having a thickness of about 120 µm. The filaments forming the mesh define interstices between the filaments. The interstices in this example have a width of around 37 µm, although larger or smaller interstices may be used. Using a mesh of these approximate dimensions allows a meniscus of aerosol-forming substrate to be formed in the interstices, and for the mesh of the heater assembly to draw aerosol-forming substrate by capillary action. The heater is placed in contact with a capillary wick holding a liquid aerosol-forming substrate. The capillary material is held within a rigid housing and the heater extends across an opening in the housing.

The heating means (e.g., a heater) may comprise inductive heating means. For example, the heating means may include an inductive heater.

The electric circuitry may be arranged to measure the electrical resistance of the one or more electric heating elements. The electric circuitry may be arranged to measure the electrical resistance of the one or more electric heating elements by measuring the current through the one or more electric heating elements and the voltage across the one or more electric heating elements. The electric circuitry may be configured to determine the electrical resistance of the at least one heating element from the measured current and voltage. The electric circuitry may comprise a resistor, having a known resistance, in series with the at least one heating element and the electric circuitry may be arranged to measure the current through the at least one heating element by measuring the voltage across the known-resistance resistor and determining the current through the at least one heating element from the measured voltage and the known resistance.

The electric circuitry may be configured to ascertain the temperature of the one or more electric heating elements from the measurements of electrical resistance. If the one or more heating elements have suitable characteristics, such as a suitable temperature coefficient of resistance, the temperature of the one or more heating elements may be ascertained from measurements of the electrical resistance of the one or more heating elements.

The electrically operated aerosol-generating system may comprise two temperatures sensors, a first temperature sensor and a second temperature sensor. The first temperature sensor may be the temperature sensor arranged in the liquid storage portion for sensing the temperature of liquid aerosol-forming substrate held in the liquid storage portion. The second temperature sensor may being arranged to sense the temperature of the heater.

The electric circuitry may be configured to determine whether to subsequently activate the heater for a second period, upon the elapse of a first particular (or, alternatively, predetermined) time after the vaporizing period, based on a previously determined liquid level or based on stored heater activation data. It may not be necessary or desirable to subsequently activate the heater after every vaporizing period. For example, it may be desirable to determine liquid level infrequently when the most recent determination was that the liquid level is high, say over 50% of maximum capacity. It may be desirable to determine liquid level more frequently as the determined liquid level gets lower. It may be appropriate to determine liquid level only after the first vaporization period of each session of use of the system. In the case of a vaping system this means determining liquid level only after the first draw of air.

Additional parameters may be factored into the determination of liquid level, including one or more of device orientation, liquid temperature, ambient temperature, type of liquid and type of heater and wick assembly. For example, the system may include one or more accelerometer to determine the orientation of the system. The orientation of the system may affect wicking rate and so may be factored into the determination of liquid level. The electric circuitry may be used with different liquid storage portions and different heaters. The wicking rate may depend on the properties of the wick and of the liquid. The temperature of the heater for a given applied power may depend on the characteristics of the heater. The identity of the type of liquid and the type of heater in the system may be used in the determination of the liquid level.

The electrically operated aerosol-generating system may further comprise an interface, wherein the electric circuitry is configured to indicate the determined liquid level in the liquid storage portion through the interface. The interface may be a display screen, one or more visual indicators, such as LEDs, an audio indicator such as speaker, a haptic indicator, or some combination of different indicators.

The liquid level may be indicated as an absolute amount of liquid, a percentage of a maximum liquid level, or as a determination that the liquid level is more or less than a threshold liquid level. The liquid level may be an average liquid level obtained from a plurality of liquid level determinations. The liquid level determined based on wicking rate may be combined with other determinations of liquid level and with liquid consumption estimates or measurements, for example consumption estimates based on heater activation time to provide a refined liquid level estimate.

The aerosol-generating system may comprise one or more electric power supplies. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more generations of aerosol; for example, the power supply may have sufficient capacity to allow for the continuous generation of aerosol for a period of around six minutes, or for a period that is a multiple of six minutes. In another example, the power supply may have sufficient capacity to allow for a particular (or, alternatively, predetermined) number of draws of air through the system and the outlet thereof or discrete activations of the heating means and actuator.

The aerosol-generating system may comprise an input, such as a switch or button. This enables the system to be turned on. The switch or button may activate the aerosol-generating means. The switch or button may initiate aerosol generation. The switch or button may prepare the control electronics to await input from a detector.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity configured to receive the power supply. The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered through the outlet of the system and may reduce the concentration of the aerosol before it is delivered through the outlet.

The aerosol-generating system may be portable. The aerosol-generating system may have a total length between about 30 mm and about 150 mm. The aerosol-generating system may have an external diameter between about 5 mm and about 30 mm.

The aerosol-generating system may comprise a main unit and a cartridge. The main unit may comprise the electric circuitry. The cartridge may comprise the liquid storage portion for holding the liquid. The main unit may be configured to removably receive the cartridge.

The main unit may comprise one or more power supplies. The main unit may comprise the heater. The cartridge may comprise the heater. Where the cartridge comprises the heater, the cartridge may be referred to as a 'cartomizer'.

The aerosol-generating system may comprise an aerosol-generating element comprising the heater. The aerosol-generating element may be separate to the main unit and the cartridge. The aerosol-generating element may be removably receivable by at least one of the main unit and the cartridge.

The cartridge may be removably coupled to the main unit. The cartridge may be removed from the main unit when the liquid has been consumed. The cartridge is in some example embodiments disposable. However, the cartridge may be reusable and the cartridge may be refillable with liquid. The cartridge may be replaceable in the main unit. The main unit may be reusable.

As used herein, the term 'removably received' is used to mean that the cartridge and the main unit can be coupled and uncoupled from one another without significantly damaging either the main unit or the cartridge.

In some example embodiments, there is provided a method for determining a liquid level of liquid in an electrically operated aerosol-generating system, the electrically operated aerosol-generating system comprising a liquid storage portion storing a liquid from which aerosol may be generated, an electric heater, a capillary wick positioned between the liquid in the liquid storage portion and the electric heater (e.g., extending between the liquid storage portion and the electric heater) and configured to convey liquid from the liquid storage portion to the electric heater, and electric circuitry connected to the electric heater, the electric circuitry configured to control activation of the electric heater, comprising: activating the electric heater for a vaporizing period in response to an input to vaporize liquid in the capillary wick, a first particular (or, alternatively, predetermined) time after the vaporizing period, activating the heater for a second period, recording a temperature measurement of the heater during or immediately following the second period; and determining a liquid level in the liquid storage portion based on the temperature measurement.

The method may further comprise activating the heater for a third period at a second particular (or, alternatively, predetermined) time after the second period, recording a temperature measurement of the heater during the third period, and determining a liquid level in the liquid storage portion based on a combination of the temperature measurement of the heater during the third period and the temperature measurement of the heater during the second period. In particular, the liquid level in the liquid storage portion may be based on a difference between the temperature measurement of the heater during the third period and the temperature measurement of the heater during the second period.

In some example embodiments, there is provided a computer readable storage medium having stored thereon a computer program which, when run on programmable electric circuitry in an electrically operated aerosol-generating system, the electrically operated aerosol-generating system comprising, a liquid storage portion storing a liquid from which aerosol may be generated, an electric heater, a capillary wick positioned between the liquid in the liquid storage portion and the electric heater and configured to convey liquid from the liquid storage portion to the electric heater, and programmable electric circuitry connected to the electric heater and configured to control activation of the electric heater, causes the programmable electric circuitry to perform the method according to some example embodiments.

It should be clear that some example embodiments can be implemented as a software update on existing hardware. In particular, it is possible to provide a software update to existing aerosol-generating systems that comprise a programmable microprocessor for controlling the operation of the system and a data interface that allows for the uploading of software to the microprocessor.

Features of some example embodiments may be applied to some separate example embodiments.

Figure 1:
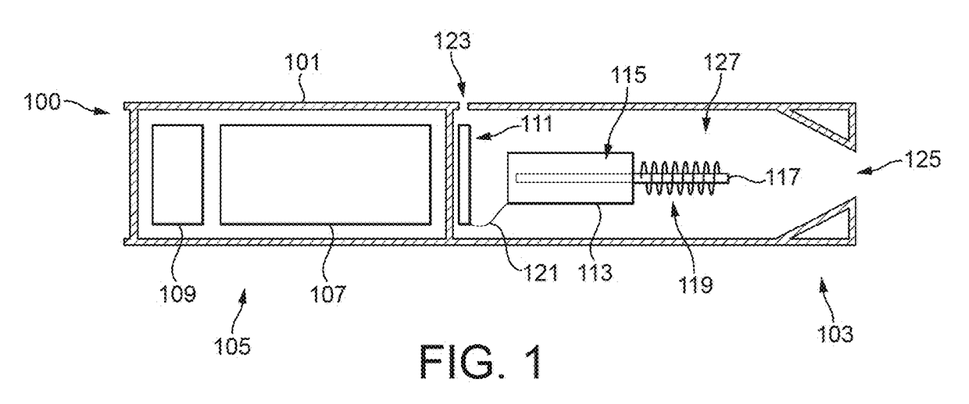
FIG. 1 shows one example of an electrically operated aerosol-generating system having a liquid storage portion.

FIG. 1 shows one example of an electrically operated aerosol generating system according to some example embodiments. Many other examples are possible, however. FIG. 1 is schematic. In particular, the elements shown are not to scale either individually or relative to one another. The aerosol generating system needs to include or receive an aerosol-forming substrate. The aerosol generating system requires a heater, for generating aerosol from the liquid and a wick or capillary material for conveying the liquid to the heater. But other aspects of the system could be changed. For example, the overall shape and size of the housing could be altered.

In FIG. 1, the device has a liquid storage portion. The device 100 of FIG. 1 comprises a housing 101 having an outlet end 103 and a body end 105. In the body end, there is provided an electric power supply in the form of battery 107 and electric circuitry in the form of hardware 109 and a detection device 111. In the outlet end, there is provided a liquid storage portion in the form of cartridge 113 containing liquid 115, a capillary wick 117 and a heater 119 comprising at least one heating element. Note that the heater is only shown schematically in FIG. 1. One end of the capillary wick 117 extends into the cartridge 113 and the other end of the capillary wick 117 is surrounded by the heater 119. Thus, the capillary wick 117 extends between the cartridge 113 and the heater 119. The heater is connected to the electric circuitry via connections 121. The housing 101 also includes an air inlet 123, an air outlet 125 at the outlet end and an aerosol-forming chamber 127.

The electric circuitry in the form of hardware 109 may include a processor and a memory. The memory may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The processor may be, a central processing unit (CPU), a controller, or an application-specific integrated circuit (ASIC), that when, executing instructions stored in the memory, configures the processor as a special purpose computer to perform the operations of the electric circuitry. Such operations performed by the electric circuitry may include controlling a supply of electrical power from a power supply of the aerosol-generating system to one or more of a pump of the aerosol-generating system and one or more elements (e.g., a heating element) of a vaporizer of the aerosol-generating system.

In use, operation is as follows. Liquid 115 is conveyed by capillary action from the liquid storage portion 113 from the end of the wick 117 which extends into the liquid storage portion to the other end of the wick which is surrounded by heater 119. When air is drawn through the aerosol generating system and through the air outlet 125, ambient air is drawn through air inlet 123. In the arrangement shown in FIG. 1, the detection device 111 senses the draw of air and activates the heater 119. The battery 107 supplies electrical energy to the heater 119 to heat the end of the wick 117 surrounded by the heater. The liquid in that end of the wick 117 is vaporized by the heater 119 to create a supersaturated vapor.

The supersaturated vapor created is mixed with and carried in the air flow from the air inlet 123. In the aerosol-forming chamber 127, the vapor condenses to form an aerosol, which is carried towards the outlet 125.

The liquid that has been vaporized is replaced by further liquid moving along the wick 117 by capillary action.

The capillary wick can be made from a variety of porous or capillary materials and in some example embodiments has a known, pre-defined capillarity. Examples include ceramic- or graphite-based materials in the form of fibers or sintered powders. Wicks of different porosities can be used to accommodate different liquid physical properties such as density, viscosity, surface tension and vapor pressure. The wick may be suitable so that a particular amount of liquid can be delivered to the heating element.

The heater in this example comprises a heating wire or filament extending around the capillary wick. The temperature of heating element may be measured by measuring resistance of heater. The heating wire has a temperature coefficient of resistance that allows for an accurate determination of the heater temperature to be made from a measurement of electrical resistance. The electric circuitry may comprise a resistor, having a known resistance, connected in series with the heating wire and the electric circuitry may be arranged to measure the current through the at least one heating element by measuring the voltage across the known-resistance resistor and determining the current through the at least one heating element from the measured voltage and the known resistance.

The rate of increase of temperature of the heating element when a given amount of power is applied to the heater is dependent on the environment surrounding the heater, and in particular is dependent on the amount of liquid in the vicinity of the heater. The more liquid there is around the heating element the more heat will be lost to the liquid, which slow the rate of temperature increase of the heating element. So, the temperature of the heating element as the heating element is heating up is dependent on the amount on liquid in the wick, which is in turn dependent on the wicking rate of the liquid at times before equilibrium has been reached.

Figure 2:
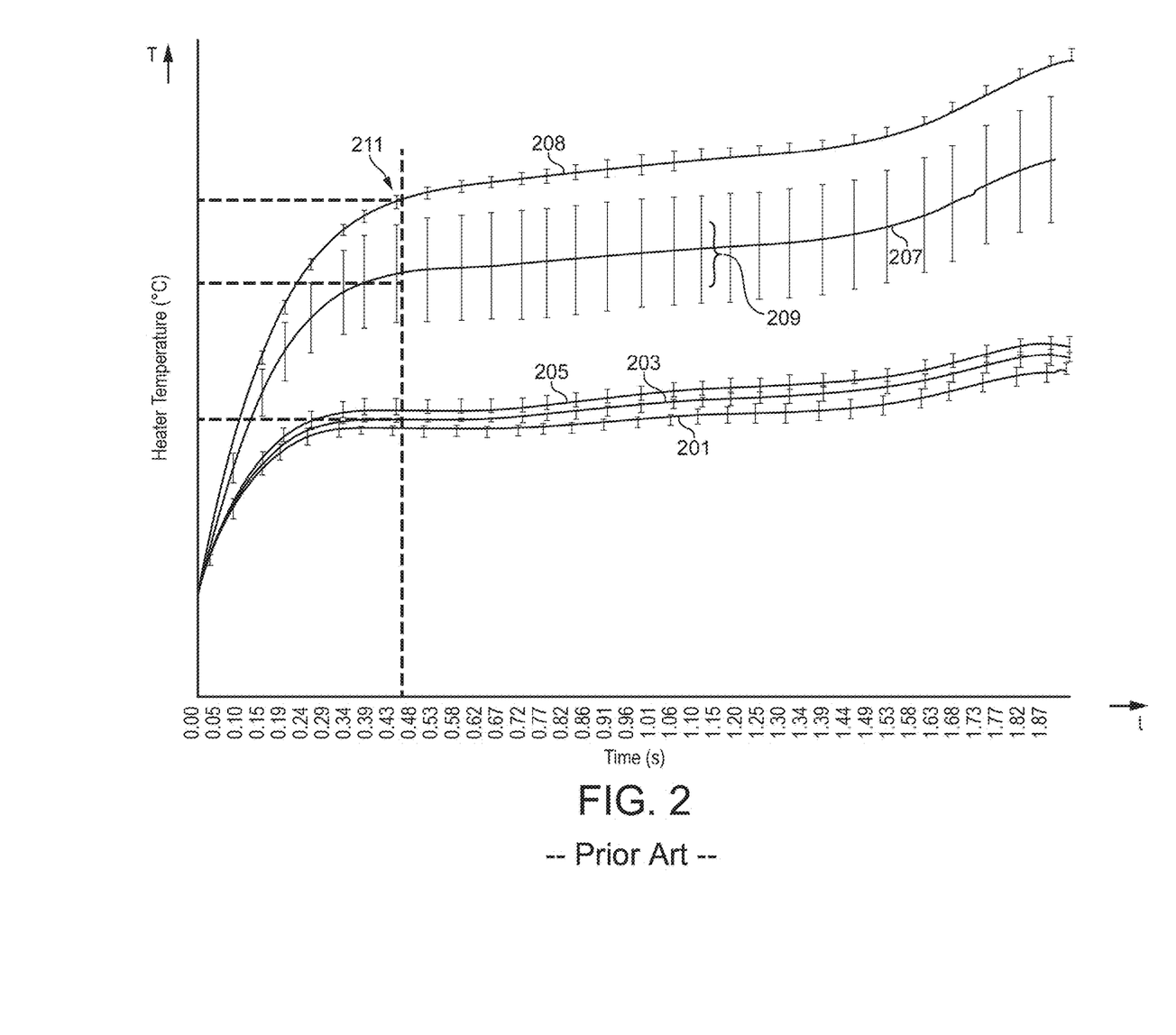
FIG. 2 is a plot showing five medians of temperature profiles of the heating element during multiple air draws of an electrically operated aerosol-generating system.

FIG. 2 is a plot showing five medians of temperature profiles being measured during multiple air draws of an aerosol-generating system when the electric heater is activated because of a request for generating aerosol. The temperature T of the heating element is shown on the y-axis and the air draw time t is shown on the x-axis. Curve 201 is the median of a first set of air draws, each air draw having a 2-second air draw duration. Similarly, curve 203 is the median of a second set of air draws, curve 205 is the median of a third set of air draws, curve 207 is the median of a fourth set of air draws and curve 208 is the median of a fifth set of air draws. In each curve, the vertical bars (for example shown at 209) indicate the standard deviation around the median for those temperatures. Thus, the evolution of the measured temperature over the life of the liquid storage portion is shown. This behavior was observed and confirmed for all liquid formulations vaporized and for all power levels used.

As can be seen from FIG. 2, the temperature response of the heating element is reasonably stable over curves 201, 203 and 205. That is to say, the standard deviation around the median for the first three sets of air draws is reasonably small. Over curve 207, two effects are noticed. Firstly, the standard deviation around the median for the third set of air draws is greater. Secondly, the temperature of the heating element during each air draw has significantly increased. These two effects are the result of the liquid storage portion becoming empty so that less liquid is delivered through the wick to the heater.

Over curve 208, the standard deviation around the median for the fifth set of air draws is smaller once again. That is to say, the temperature range over the air draws is reasonably stable. However, the temperature of the heating element during each air draw has increased further. This is because the liquid storage portion is substantially empty.

The temperature increase in curve 207, as compared with curve 205, is particularly evident after around 0.4 seconds of the air draw (shown by dotted line 211). Detecting differences in the amount of liquid in the vicinity of the heating element can therefore be accurately based on the temperature level of the heating element after 0.4 seconds of the air draw duration.

FIG. 2 demonstrates that there is a clear temperature increase of the heating element as the liquid storage portion becomes empty. This is particularly evident after the first 0.4 seconds of an air draw. This temperature increase can be utilized to determine when the liquid storage portion is empty or nearly empty.

It can also be seen in FIG. 2 that the slope of the temperature profile between 0 seconds and 0.2 seconds increases as the liquid storage portion becomes empty. Thus, a measure of the rate of temperature increase during an initial time of an air draw over the life of the liquid storage portion can provide an alternative or additional means to detect an amount of the remaining liquid in the liquid storage portion.

However, this technique can also be used to determine liquid level even when the liquid storage portion is relatively full if measurement is made while liquid is being drawn onto the wick following a vaporizing period (e.g., first heating time period). The rate of wicking of the liquid onto the wick is dependent on the liquid level in the liquid storage portion. The rate of wicking can be determined by determining the amount of liquid on the wick at a first time, determining the amount of liquid on the wick a particular (or, alternatively, predetermined) time later (while the liquid is still wicking onto the coil), and then dividing the difference in the amounts of liquid by the particular (or, alternatively, predetermined) time. The amount of liquid in the wick is related to the temperature of the heating element early in a heater activation, as described above. So by measuring the temperature of the heating element at different times as liquid is still being drawn onto the wick, a measure of wicking rate can be obtained.

Figure 3:
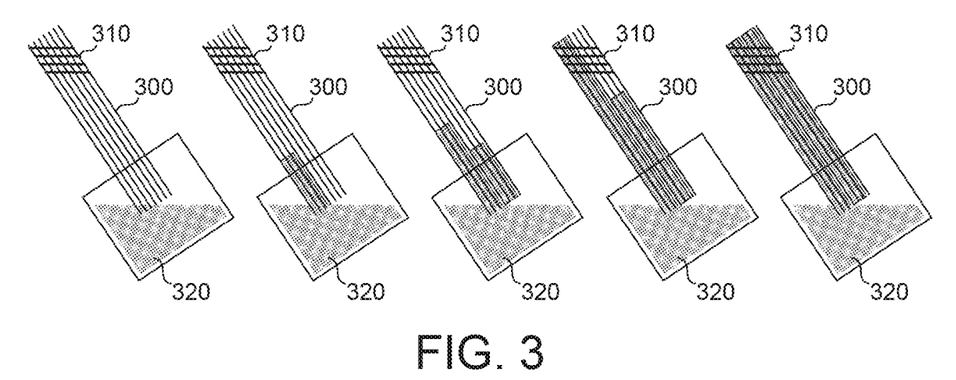
FIG. 3 is an illustration of the wicking of liquid at low liquid level.

FIG. 3 illustrates one example of how liquid level in a liquid storage portion can affect the rate at which liquid is wicked to the heating element. The wick 300 in FIG. 3 is a bundle of fibers that, in effect, give rise to a plurality of capillary tubes through which liquid is drawn. A heating element 310, in the form of a coiled filament, is wound around one end of the wick 300. The opposite end of the wick extends into a liquid storage tank 320, which is half filled with liquid. FIG. 3 illustrates the progress of liquid as it is drawn up the wick 300 to the heating element 310, with the initial state shown on the left and the final state (equilibrium) shown on the right. When the system is tilted, as shown in FIG. 3, the area of wick, and specifically the area of the end of the wick, in contact with the liquid is reduced. This reduces the wicking rate. The liquid transfers sideways across the wick into that part of the wick not in contact with the wick. This is a slower process than wicking up the capillary tubes.

The lower the liquid level, the smaller the area of the end of the wick in contact with the wick and so the lower the wicking rate. Of course the system will not always be tilted at a one particular angle from the vertical, but nor will it remain perfectly vertical. It is also the case that some liquid will be drawn into the wick through sidewalls of the wick. On average the lower the liquid level in the liquid tank the lower the wicking rate of liquid onto the wick.

Figure 4:
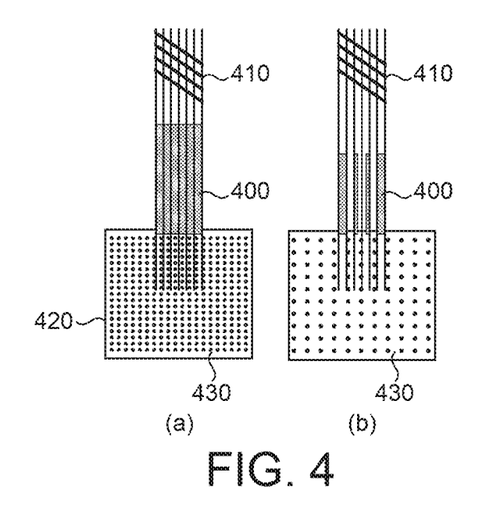
FIG. 4 is an illustration of the wicking of liquid from liquid held in a carrier material.

FIG. 4 shows second example of how liquid level affects wicking rate. FIG. 4 illustrates a wick 400, a heating element 410 and a liquid tank 420 as in FIG. 3. But in the example shown in FIG. 4 the liquid tank 420 comprises a liquid carrier material 430. As the liquid in the liquid tank is consumed and the liquid level drops, the liquid is distributed across the liquid carrier material and so the liquid density drops. This means that as the liquid level drops the amount of liquid in contact in contact with the end of the wick is reduced. This reduces the wicking rate. FIG. 4a shows a relatively full liquid tank and FIG. 4b shows an emptier liquid tank, with a corresponding lower wicking rate up the wick.

Figure 5:
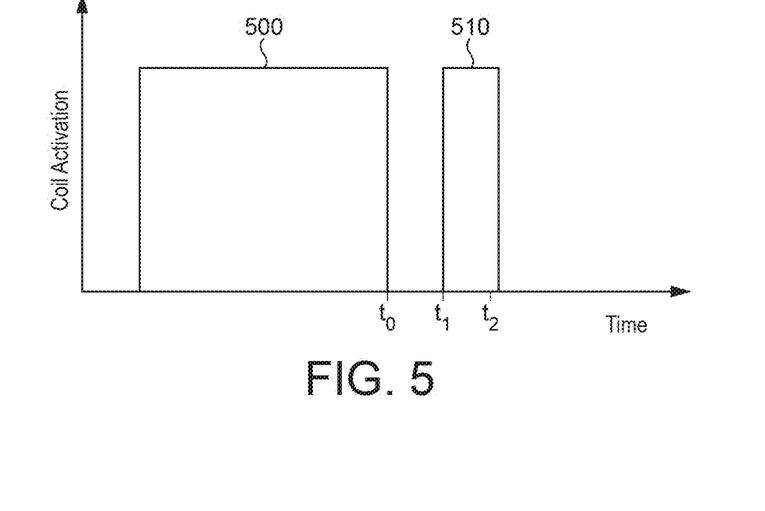
FIG. 5 is an illustration of activation of a heater in accordance with some example embodiments.

Liquid level based on wicking rate can be determined in a number of ways. FIG. 5 illustrates a first embodiment of a control process configured to determine liquid level by determining wicking rate based on a single heater activation. The process of FIG. 5 relies on an assumption that following a heater activation to vaporize liquid in the wick, the level of liquid in the vicinity of the wick is consistent. So a measure of liquid level immediately after an activation of the heater is not measured but has been determined during a calibration process during manufacture or device development.

FIG. 5 illustrates the activation of the heater over time. In FIG. 5 power is applied to the heater in response to air being drawn through the system and through the outlet (referred to herein as an "air draw" and/or "draw of air"), as illustrated by vaporizing period 500. The application of power to the heater in response to the air draw being ended at time $t_0$. At time $t_0$ the liquid in the wick is depleted as a result of vaporization. At time $t_1$, which is a particular (or, alternatively, predetermined), constant period after $t_0$, power is applied to the heater again for a second period 510. The second period 510 is shorter than the vaporizing period 500 and is sufficiently short that the heater does not reach the vaporization temperature of the liquid during the second period. At time $t_2$, which is at or close to the end of the second period 510, the temperature of the heater is measured. The time $t_2$ is chosen to be a time at which liquid is still being drawn onto the wick, before equilibrium is reached, even when the liquid storage portion is full. Because the liquid level in the wick at time $t_0$, and the temperature and cooling rate of the heater is assumed to be consistent from air draw to air draw, the temperature of the heater at time $t_2$ is directly related to the wicking rate of liquid onto the wick and so is related to the liquid level in the liquid storage portion, as described.

Empirical data for particular designs of aerosol-forming substrate and for the particular system design can be stored in memory in the electric circuitry. This empirical data can relate the temperature of the heating element at a $t_2$ with the amount of liquid remaining in the liquid storage portion. The empirical data can then be used to determine how much liquid is remaining and may be used to provide an indication of liquid level ("liquid amount") or that liquid level is estimated to be below a threshold level.

Figure 6:
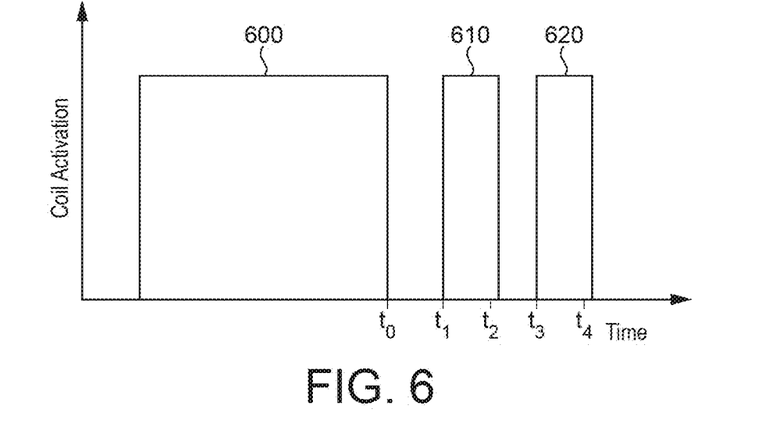
FIG. 6 is an illustration of activation of a heater in accordance with some example embodiments.

FIG. 6 is a second embodiment of a control process configured to determine liquid level based on two heater activations. In FIG. 6 power is applied to the heater in response to air being drawn through the system and through the outlet thereof, as illustrated by vaporizing period 600. The application of power to the heater in response to the draw of air being ended at time $t_0$. At time $t_0$ the liquid in the wick is depleted as a result of vaporization. At time $t_1$, which is a set period after $t_0$, power is applied to the heater again for a second period 610. The second period 610 is shorter than the vaporizing period 600 and is sufficiently short that the heater does not reach the vaporization temperature of the liquid. At time $t_2$, which is at or close to the end of the second period 610, the temperature of the heater is measured. At time $t_3$, which is a set period after $t_0$, power is applied to the heater again for a third period 620. The third period 620 is also shorter than the vaporizing period 600 and is sufficiently short that the heater does not reach the vaporization temperature of the liquid. At time $t_4$, which is at or close to the end of the third period 620, the temperature of the heater is measured again. The time $t_4$ is chosen to be a time at which liquid is still being drawn onto the wick, before equilibrium is reached, even when the liquid storage portion is full.

The liquid level at the heater at time $t_2$ is determined from the temperature measurement at time $t_2$. The liquid level at the heater at time $t_4$ is determined from the temperature measurement at time $t_4$. The wicking rate is determined from the difference between the liquid level at the heater at time $t_2$ and the liquid level at the heater at time $t_4$, divided by the time difference between $t_2$ and $t_4$. The determined wicking rate can be related to the liquid level in the liquid storage portion using empirical data stored in a memory in the electric circuitry, as described. An indication of liquid level can then be provided.

The determination of liquid level as described with reference to FIG. 5 or FIG. 6 may be repeated after successive activations of the heater and an average liquid level may be determined and indicated. It is also possible to combine the described methods of liquid level estimation with other techniques such as techniques that determine liquid consumption based on a number or measurement of activations of the heater to provide a refined estimate of liquid level.

The estimation of liquid level may also be modified to account for other effects, such as ambient temperature or liquid temperature, that might affect wicking rate, or the length of vaporizing period, that might affect the amount of liquid in the wick immediately following the vaporizing period.

Some example embodiments are applicable to different physical arrangements of wick, heater and liquid storage portion. Empirical data can be stored for each possible arrangement, and for different liquids and adult vapers. For example, the wick may extend at both ends into the liquid storage portion with the heater at position intermediate the two ends. The heater, wick and liquid storage portion may also be provided in a cartridge or "cartomizer" separable from the electric circuitry. The electric circuitry may store empirical data relating to a plurality of different cartridge or cartomizer designs that may store different liquids.

Some example embodiments have a number of advantages. Measuring the wicking rate provides a means to estimate the liquid level without having to continually monitor and store information about the system usage. The methods of some example embodiments are therefore cheaper and simpler to implement than prior methods that rely on continually monitoring heater usage.

some example embodiments may apply equally to cartomizers and tank based systems where the liquid storage portion can be refilled. some example embodiments may be used in systems where the starting liquid level is not known.

Some example embodiments use automated activation of the heater that does not rely on measurement during an activation. Automated activation can be controlled more precisely than activation. The automated activation does not need to be implemented every time an adult vaper operates the device. Power consumption can be greatly reduced by infrequent use of the self-activation.

Some example embodiments may be implemented through modification to control programs in existing systems. It may be possible simply to provide software and data to existing systems in order to implement some example embodiments.

The invention claimed is:

1. A non-transitory computer readable storage medium having stored thereon a computer program which, when run on programmable electric circuitry in an electrically operated aerosol-generating system, causes the programmable electric circuitry to perform a method for determining an amount of liquid in the electrically operated aerosol-generating system, the electrically operated aerosol-generating system including a liquid storage portion configured to store a liquid from which aerosol may be generated, an electric heater, a capillary wick between the liquid in the liquid storage portion and the electric heater and configured to convey liquid from the liquid storage portion to the electric heater, the programmable electric circuitry being connected to the electric heater, the programmable electric circuitry configured to control activation of the electric heater, the method comprising:

activating the electric heater for a first heating time period in response to air being drawn through the electrically operated aerosol-generating system, such that liquid in the capillary wick is vaporized during the first heating time period, and the electric heater is deactivated at an ending of the first heating time period based on an end of the drawing of air through the electrically operated aerosol-generating system, activating the electric heater for a second heating time period in response to an elapse of a first cooling time period after the ending of the first heating time period, the second heating time period beginning at a first time and ending at a second time such that the electric heater is deactivated at the second time, wherein the second heating time period is shorter than the first heating time period such that a temperature of the electric heater remains below a vaporization temperature of the liquid and the liquid in the capillary wick is not vaporized during the activation of the electric heater for the second heating time period, recording a first temperature measurement of the electric heater at the second time at the ending of the second heating time period, such that the first temperature measurement is recorded while the temperature of the electric heater remains below the vaporization temperature of the liquid and the liquid is still wicking on to the capillary wick;

activating the electric heater for a third heating time period in response to an elapse of a second cooling time period after the ending of the second heating time period, the third heating time period beginning at a third time and ending at a fourth time such that the electric heater is deactivated at the fourth time, wherein the third heating time period is shorter than the first heating time period such that the temperature of the electric heater remains below the vaporization temperature of the liquid during the activation of the electric heater for the third heating time period, recording a second temperature measurement of the electric heater at the fourth time at the ending of the third heating time period, such that the second temperature measurement is recorded while the temperature of the electric heater remains below the vaporization temperature of the liquid and the liquid is still wicking on to the capillary wick, determining a temperature difference between the first temperature measurement and the second temperature measurement, and determining an amount of liquid in the liquid storage portion based on applying the temperature difference to an empirically-determined relationship, stored in a memory of the electrically operated aerosol-generating system, between temperature differences and amounts of liquid in the liquid storage portion.

2. The non-transitory computer readable storage medium according to according to claim 1 wherein the second heating time period is between 0.05 and 0.5 seconds.

3. The non-transitory computer readable storage medium according to claim 1, wherein the elapse of the first cooling time period is between 0.2 and 2 seconds after the ending of the first heating time period.

4. The non-transitory computer readable storage medium according to claim 1, the method further comprising:

determining whether to subsequently activate the electric heater for the second heating time period upon the elapse of the first cooling time period after the first heating time period based on a previously determined amount of liquid or based on stored heater activation data.

5. The non-transitory computer readable storage medium according to claim 1, wherein the electrically operated aerosol-generating system is an electrically operated vaping system.

6. The non-transitory computer readable storage medium according to claim 1, wherein the electric heater is associated with a temperature coefficient of resistance; and the first and second temperature measurements of the electric heater are recorded, at the second and fourth times, respectively, based on measuring a voltage across the electric heater, measuring a voltage across a resistor that is electrically connected in series with the electric heater, determining an electrical current through the electric heater based on a known electrical resistance of the resistor and the voltage across the resistor and further based on the resistor being electrically connected in series with the electric heater, determining an electrical resistance of the electric heater based on the voltage across the electric heater and the electrical current through the electric heater, and determining the temperature of the electric heater based on the electrical resistance of the electric heater and the temperature coefficient of resistance of the electric heater.

7. The non-transitory computer readable storage medium according to claim 1, wherein the electrically operated aerosol-generating system is configured to sense the temperature of the electric heater; and the first and second temperature measurements of the electric heater are recorded, at the second and fourth times, respectively, based on the temperature of the electric heater at the second and fourth times, respectively.

* * * * *